(12) United States Patent
Hayashi (10) Patent No.: US 9,366,332 B2
(45) Date of Patent: Jun. 14, 2016

(54) POWER TRANSMISSION DEVICE

(71) Applicant: Sumitomo Heavy Industries, Ltd., Tokyo (JP)

(72) Inventor: Yoshiki Hayashi, Okayama (JP)

(73) Assignee: Sumitomo Heavy Industries, Ltd., Tokyo (JP)

( * ) Notice: Subject to any disclaimer, the term of this patent is extended or adjusted under 35 U.S.C. 154(b) by 0 days.

(21) Appl. No.: 14/452,023

(22) Filed: Aug. 5, 2014

(65) Prior Publication Data

US 2014/0338495 A1 Nov. 20, 2014

Related U.S. Application Data

(63) Continuation of application No. PCT/JP2013/056971, filed on Mar. 13, 2013.

(30) Foreign Application Priority Data

Mar. 29, 2012 (JP) ................................. 2012-078391

(51) Int. Cl.
*F16H 57/04* (2010.01)

(52) U.S. Cl.
CPC ........ *F16H 57/0416* (2013.01); *F16H 57/0495* (2013.01); *Y10T 74/2189* (2015.01)

(58) Field of Classification Search
CPC .......... F16H 57/0416; F16H 57/02073; F16H 57/0495; F16H 57/027; F04D 29/4233; Y10T 74/2186; Y10T 74/2189
See application file for complete search history.

(56) References Cited

U.S. PATENT DOCUMENTS

| 4,872,502 | A | * | 10/1989 | Holzman ............ F16H 57/0415 165/119 |
|---|---|---|---|---|
| 6,643,129 | B2 | | 11/2003 | Fujiwara |
| 7,684,190 | B2 | | 3/2010 | Aoki et al. |
| 2003/0007327 | A1 | | 1/2003 | Fujiwara |
| 2004/0141290 | A1 | | 7/2004 | Aoki et al. |
| 2005/0236139 | A1 | | 10/2005 | Konruff et al. |
| 2008/0144279 | A1 | | 6/2008 | Yamamoto et al. |

FOREIGN PATENT DOCUMENTS

| JP | H08-105521 A | 4/1996 |
|---|---|---|
| JP | H09-64568 A | 3/1997 |
| JP | 2003-023281 A | 1/2003 |
| JP | 2004-221471 A | 8/2004 |

(Continued)

OTHER PUBLICATIONS

Office Action issued in Japanese Application No. 2012-078391, dated Jun. 26, 2015.

(Continued)

*Primary Examiner* — Thomas Diaz
(74) *Attorney, Agent, or Firm* — Michael Best & Friedrich LLP (57) ABSTRACT

A power transmission device includes a casing, a first shaft, and a second shaft, wherein the first shaft has a protruding portion which protrudes from the casing, a fan is provided at the protruding portion, a fan cover configured to cover the fan has an extending portion which extends toward a bearing supporting portion of the second shaft along a side surface of the casing, and the extending portion is inclined so as to approach the side surface of the casing toward the bearing supporting portion side from the fan side.

11 Claims, 6 Drawing Sheets

(56) References Cited

FOREIGN PATENT DOCUMENTS

| | | |
|---|---|---|
| JP | 2005-308070 A | 11/2005 |
| JP | 2008-140802 A | 6/2008 |
| JP | 2011-021755 A | 2/2011 |
| ZA | GB 2282206 A * 3/1995 | ......... F16H 57/0415 |

OTHER PUBLICATIONS

Extended Search Report issued in European Patent Application No. 13769108.5, dated Mar. 3, 2016.

* cited by examiner

Related Art

POWER TRANSMISSION DEVICE

INCORPORATION BY REFERENCE

Priority is claimed to Japanese Patent Application No. 2012-078391, filed Mar. 29, 2012, and International Patent Application No. PCT/JP2013/056971, the entire content of each of which is incorporated herein by reference.

BACKGROUND

1. Technical Field

The present invention relates to a power transmission device.

2. Description of the Related Art

Figure 6:
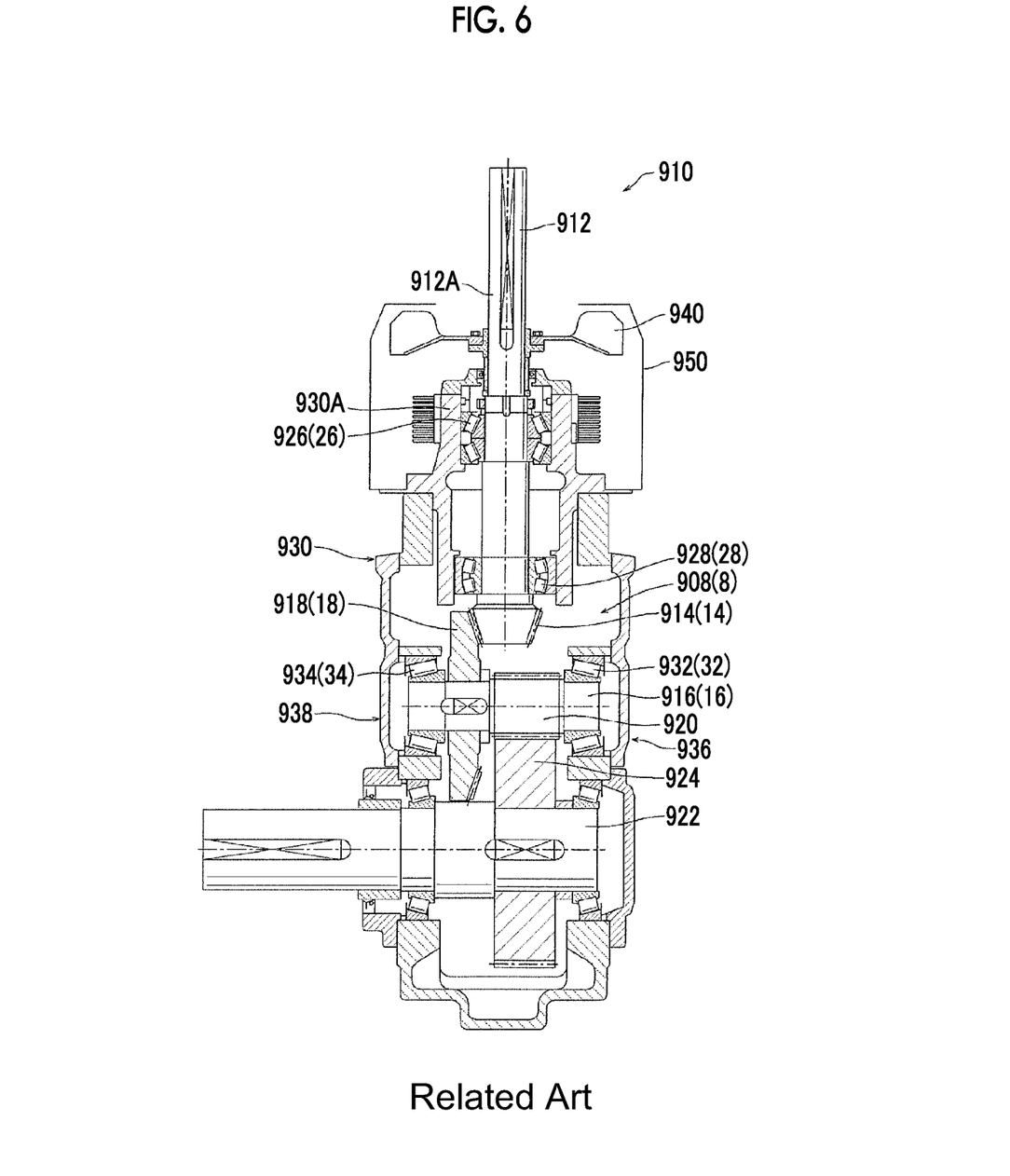
FIG. 6 is a cross-sectional view showing an example of the configuration of a power transmission device (a reduction gear) of the related art.

For example, the related art discloses a reduction gear 910 having a reduction mechanism 908 as shown in FIG. 6. The reduction gear 910 is an orthogonal reduction gear provided with a bevel pinion 914 provided at a leading end of an input shaft 912, and a bevel gear 918 which is provided at an intermediate shaft 916 and is meshed with the bevel pinion 914. The intermediate shaft 916 is further provided with an intermediate pinion 920, and the intermediate pinion 920 is meshed with an output gear 924 provided at an output shaft 922.

The input shaft 912 is supported by a motor-side bearing 926 and a motor-opposite-side bearing 928. The motor-side bearing 926 of the input shaft 912 is accommodated in a bearing casing 930A disposed to protrude from a reduction gear casing 930 (as a portion thereof). In addition, the intermediate shaft 916 is supported by bearing supporting portions 936 and 938 having bearings 932 and 934.

In the reduction gear 910, the motor side of the input shaft 912 protrudes from the bearing casing 930A. A fan (a cooling fan) 940 is mounted on a protruding portion 912A of the input shaft 912.

A fan cover 950 is attached to the fan 940. In this way, by an air flow caused by the fan 940, in particular, the bearing casing 930A of the input shaft 912 is efficiently cooled and the cooling of the entirety of the reduction gear casing 930 is also performed together therewith.

SUMMARY

According to an embodiment of the present invention, there is provided a power transmission device including: a casing; a first shaft; and a second shaft, wherein the first shaft has a protruding portion which protrudes from the casing, a fan is provided at the protruding portion, a fan cover configured to cover the fan has an extending portion which extends toward a bearing supporting portion of the second shaft along a side surface of the casing, and the extending portion is inclined so as to approach the side surface of the casing toward the bearing supporting portion side from the fan side.

DETAILED DESCRIPTION

In the structure disclosed in the related art, the actual situation is that, although the cooling of the vicinity of the bearing casing 930A of the input shaft 912 provided with the fan 940 can be certainly performed well, there is a case where, for example, the cooling of the bearing supporting portions 936 and 938 of the intermediate shaft 916 which is far in distance from the input shaft 912 provided with the fan 940 is not necessarily performed well.

It is desirable to provide a power transmission device in which it is possible to efficiently cool a bearing supporting portion of a shaft which is not provided with a fan.

In certain embodiments of the present invention, the fan is provided at the first shaft protruding from the casing, and the fan cover of the fan extends toward the bearing supporting portion of the second shaft (being separate from the first shaft) along the side surface of the casing. In addition, in the above-described configuration, the "side surface of the casing" is intended to refer to a surface in which the bearing supporting portion of the second shaft is present, among the outer surfaces of the casing.

The extending portion of the fan cover is inclined so as to approach the side surface of the casing toward the bearing supporting portion side of the second shaft from the fan side. As a result, it is possible to lead an air flow from the fan to the bearing supporting portion of the second shaft while suppressing a decrease in flow velocity, and thus it is possible to efficiently cool the bearing supporting portion of the second shaft which is far in distance from the first shaft provided with the fan.

Hereinafter, an example of an embodiment of the present invention will be described in detail based on the drawings.

Figure 1:
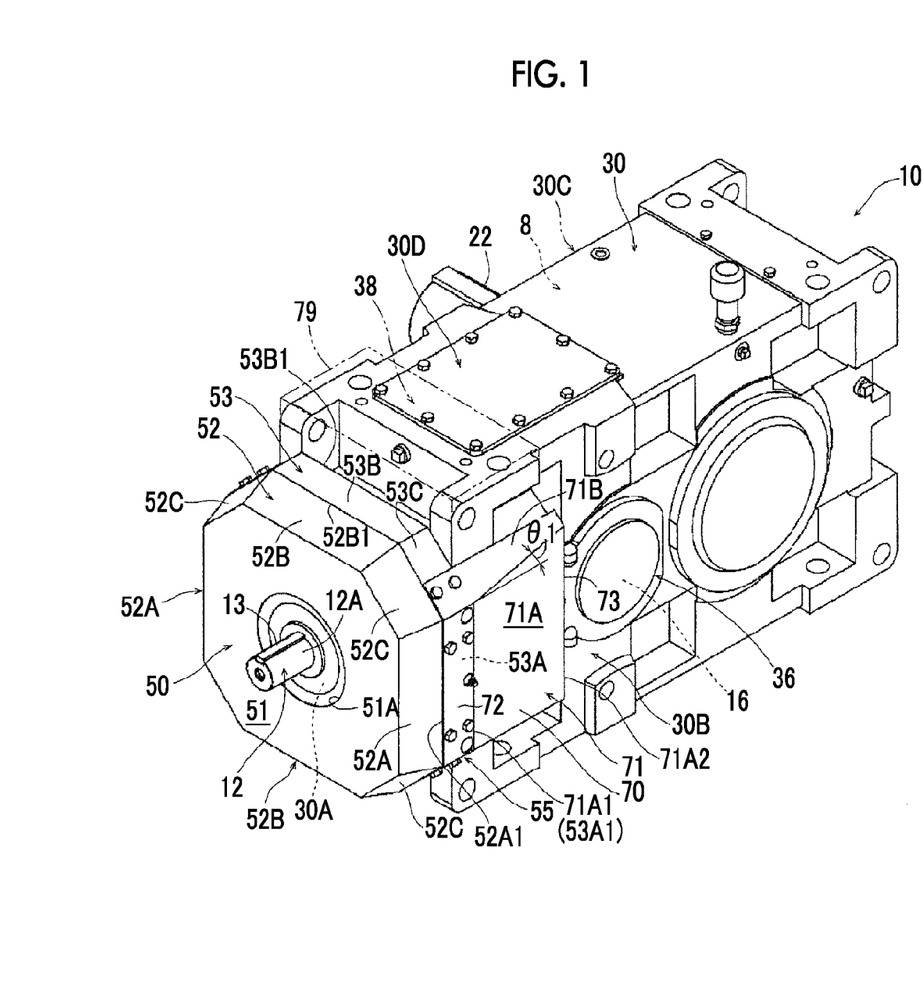
FIG. 1 is a perspective view showing the configuration of a reduction gear according to an example of an embodiment of the present invention.
Figure 2:
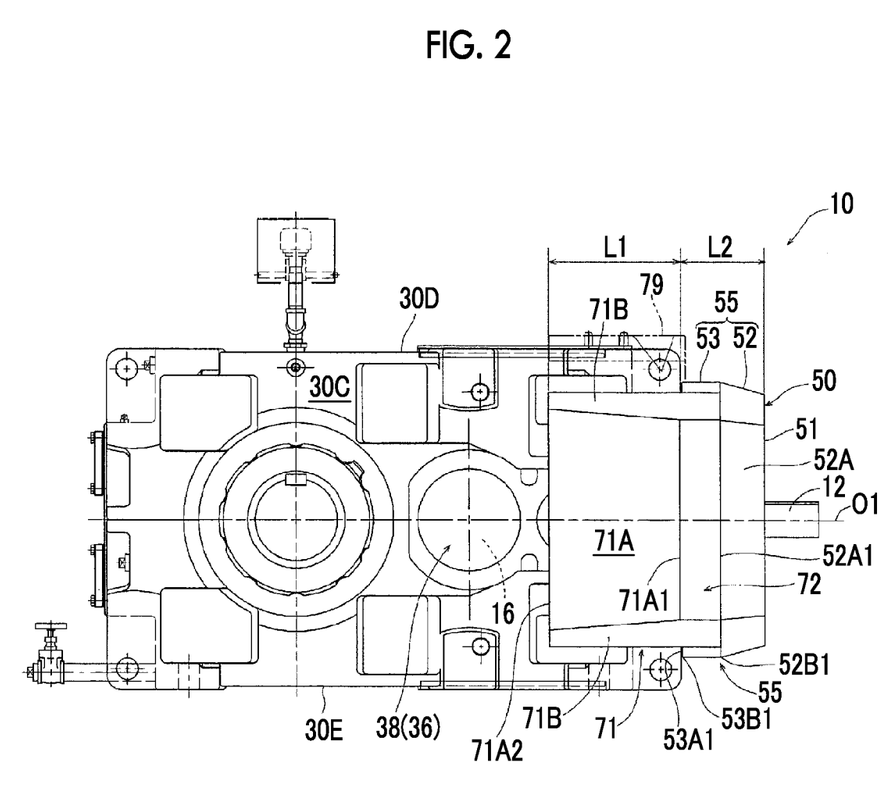
FIG. 2 is a side view of the reduction gear.
Figure 3:
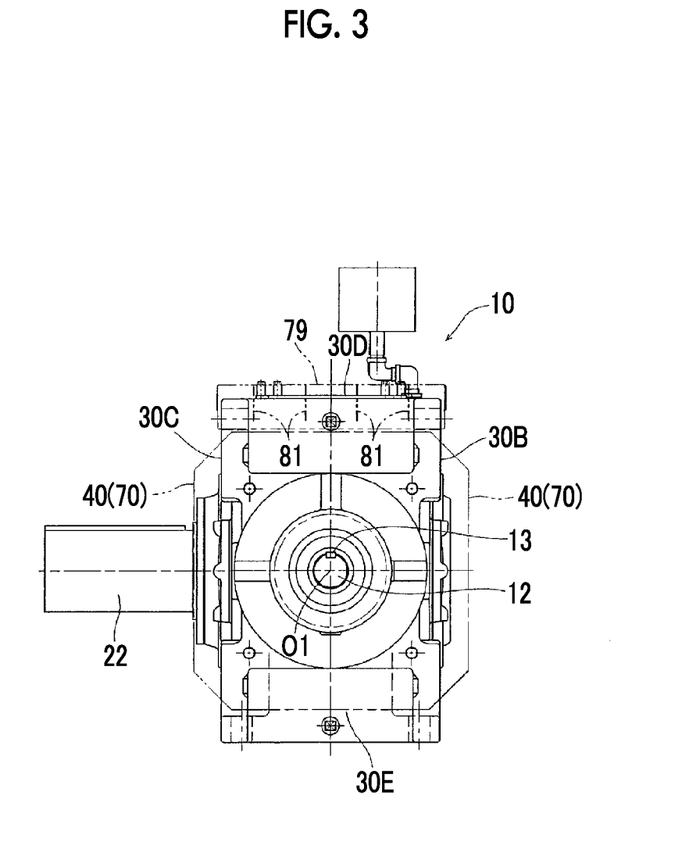
FIG. 3 is a front view of the reduction gear.
Figure 4:
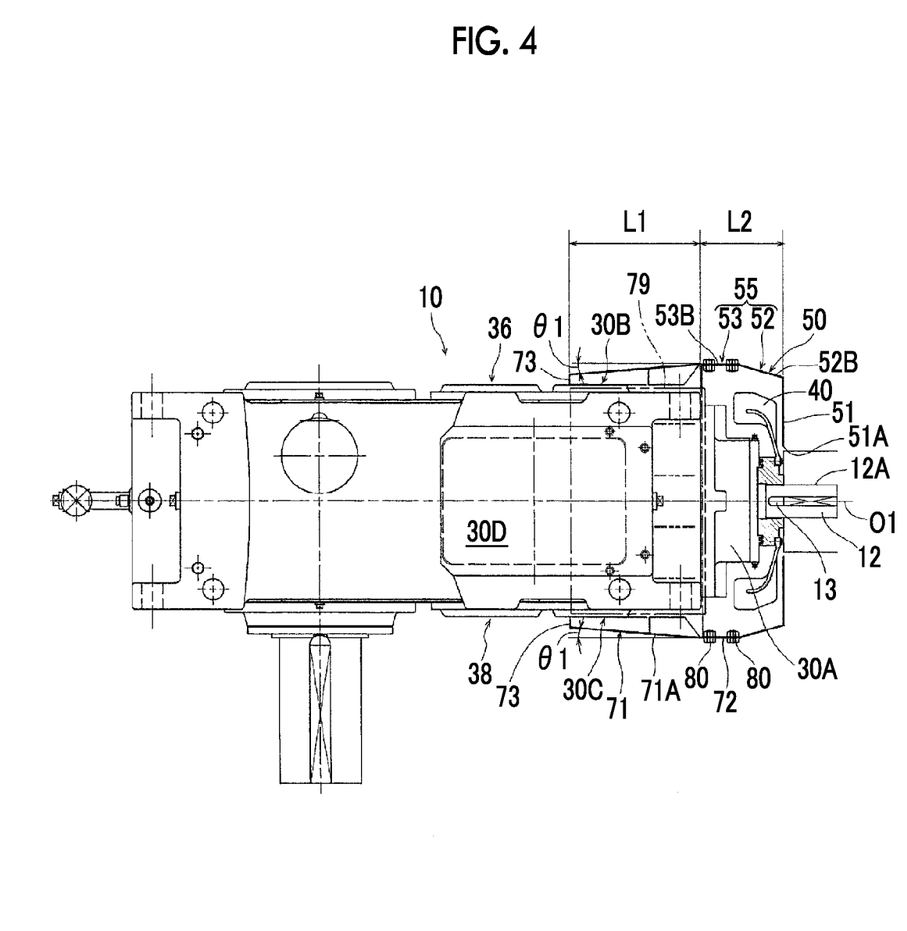
FIG. 4 is a plan view (seen through a fan cover) of the reduction gear.

FIG. 1 is a perspective view showing the configuration of a reduction gear (a power transmission device) according to an example of an embodiment of the present invention, and FIGS. 2 to 4 respectively are a side view of the reduction gear, a front view of the reduction gear, and a plan view seen through a fan cover of the reduction gear.

A reduction mechanism 8 of a reduction gear 10 according to this embodiment is basically the same as the reduction mechanism 908 of the reduction gear 910 of FIG. 6 already described. Therefore, in description, a substantially same portion as that in FIG. 6 will be denoted by the same reference numeral as the last two digits of the reference numeral in FIG. 6 together with appropriately referring to FIG. 6.

Referring to FIGS. 1 to 4 (and FIG. 6), the reduction gear 10 is provided with a reduction gear casing 30, an input shaft (a first shaft) 12, and an intermediate shaft (a second shaft) 16 orthogonal to the input shaft 12. The input shaft 12 is supported by a motor-side bearing (refer to FIG. 6) 26 accommodated in a bearing casing 30A which is a portion of the reduction gear casing 30, and a motor-opposite-side bearing (refer to FIG. 6) 28. The intermediate shaft 16 is supported on the reduction gear casing 30 by bearings (refer to FIG. 6) 32 and 34 provided at bearing supporting portions 36 and 38.

The input shaft 12 has a protruding portion 12A protruding from the bearing casing 30A of the reduction gear casing 30. A fan (a cooling fan) 40 is mounted on the protruding portion 12A through a key 13. A fan cover 50 is attached to the fan 40.

The fan cover 50 is provided with a back surface portion 51 perpendicular to a shaft on the motor (not shown) side, and first and second guide portions 52 and 53 formed successively from the back surface portion 51.

A through-hole 51A is formed at the center in a radial direction of the back surface portion 51 of the fan cover 50. In addition, although not illustrated, a large number of small holes are sometimes formed outside the through-hole 51A. The through-hole 51A (and the large number of small holes) formed in the back surface portion 51 configures an air intake of the fan cover 50.

The fan 40 is configured so as to send taken-in air radially outward irrespective of the input shaft 12 rotating in either direction. In order to make a sent air flow be directed to the reduction gear 10 side, the first and second guide portions 52 and 53 are successively formed at the back surface portion 51 of the fan cover 50. That is, the first and second guide portions 52 and 53 are equivalent to sites fulfilling a guide function which turns the air flow sent radially outward by the rotation of the fan 40 to the reduction gear 10 side, thereby leading the air flow to the reduction gear 10 side. In this embodiment, for convenience, a section which includes the first and second guide portions 52 and 53 will be referred to as a "base end section 55".

The first guide portion 52 of the base end section 55 of the fan cover 50 is made such that a diameter becomes larger with respect to an axial center O1 of the fan 40 (becomes more distant from the axial center O1) going toward the intermediate shaft 16. Specifically, the first guide portion 52 is provided with first vertical surfaces 52A, first horizontal surfaces 52B, and first connection surfaces 52C. The first vertical surfaces 52A of the first guide portion 52 extend so as to have vertical edges 52A1 parallel to side surfaces (surface in which the bearing supporting portions of the second shaft are present: in this embodiment, two surfaces provided to be vertically erect) 30B and 30C of the reduction gear casing 30. The first horizontal surfaces 52B extend so as to have horizontal edges 52B1 parallel to upper and lower surfaces (horizontal surfaces connecting the two side surfaces 30B and 30C of the reduction gear casing 30) 30D and 30E of the reduction gear casing 30. The first connection surface 52C connects the first vertical surface 52A and the first horizontal surface 52B.

The second guide portion 53 of the base end section 55 of the fan cover 50 extends substantially parallel to the axial center O1 of the fan 40. The second guide portion 53 is also configured to have second vertical surfaces 53A extending so as to have vertical edges 53A1 parallel to the side surfaces 30B and 30C of the reduction gear casing 30, second horizontal surfaces 53B extending so as to have horizontal edges 53B1 parallel to the upper and lower surfaces 30D and 30E of the reduction gear casing 30, and second connection surfaces 53C each connecting the second vertical surface 53A and the second horizontal surface 53B.

In this manner, in this embodiment, the first and second guide portions 52 and 53 of the base end section 55 of the fan cover 50 are configured to have the first and second vertical surfaces 52A and 53A having the vertical edges 52A1 and 53A1 parallel to the side surfaces 30B and 30C of the reduction gear casing 30 and the first and second horizontal surfaces 52B and 53B having the horizontal edges 52B1 and 53B1 parallel to the upper and lower surfaces 30D and 30E (without assuming a simple circular shape along the locus of rotation of the fan 40). This is because, in this embodiment, as will be described later, there is an intention of desiring causing the air flow of the fan 40 to be directed so as to go along the outer surfaces (the side surfaces 30B and 30C and the upper and lower surfaces 30D and 30E) of the reduction gear casing 30.

On the other hand, the fan cover 50 according to this embodiment further has extending portions 71 which extend toward the bearing supporting portions 36 and 38 of the intermediate shaft (the second shaft) 16 along the side surfaces 30B and 30C of the reduction gear casing 30 from the base end section 55. In this embodiment, specifically, the extending portion 71 is configured by a side cover body 70 which is a separate member from the fan cover 50. The side cover body 70 has a connecting portion 72 adjacent to the extending portion 71. The side cover body 70 is fixed to the second guide portion 53 of the fan cover 50 through the connecting portion 72 in a cantilever state by a bolt 80.

As is apparent from the perspective view of FIG. 1, the plan view of FIG. 4, and the schematic diagrams of FIGS. 5A to 5D, the extending portions 71 are inclined by $\theta 1$ so as to approach the side surfaces 30B and 30C of the reduction gear casing 30 toward sides of the bearing supporting portions 36 and 38 (of the intermediate shaft 16 which is the second shaft) from the fan 40 side.

More specifically, in this embodiment, the axial length (a length in the axial direction of the input shaft 12) of the extending portion 71 is L1 and is longer than an axial length L2 of the base end section 55 (L1>L2). The extending portion 71 has a substantially rectangular shape as a whole and is configured to mainly have an inclined portion 71A to lead an air flow sent by the fan 40 so as to bring the air flow close to the side surfaces 30B and 30C of the reduction gear casing 30, and bent portions 71B which are formed adjacent to the inclined portion 71A and prevent the air flow from diffusing in an up-and-down direction. The inclined portion 71A of the extending portion 71 has a starting point edge 71A1 which is a starting point thereof and coincides with the vertical edge 53A1 of the second guide portion 53 of the base end section 55 of the fan cover 50 (has the starting point edge 71A1 parallel to the side surfaces 30B and 30C of the reduction gear casing 30), and extends (to have the inclination $\theta 1$) toward an opening edge 71A2 on a side of the bearing supporting portions 36 and 38 (of the intermediate shaft 16 which is the second shaft) from the starting point edge 71A1 on the fan 40 side. The opening edge 71A2 itself is parallel to the side surfaces 30B and 30C of the reduction gear casing 30.

Figure 5A:
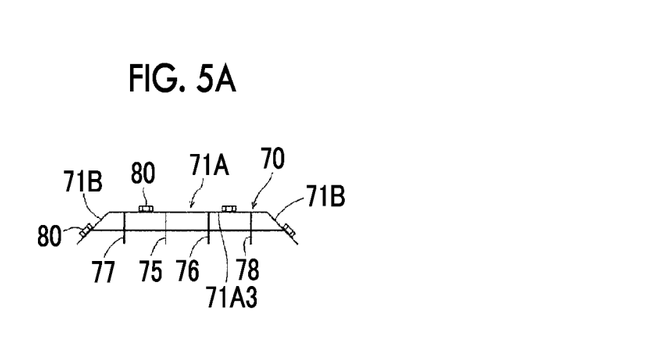
FIGS. 5A to 5D are schematic diagrams when a side cover body is viewed from a plurality of angles.
Figure 5B:
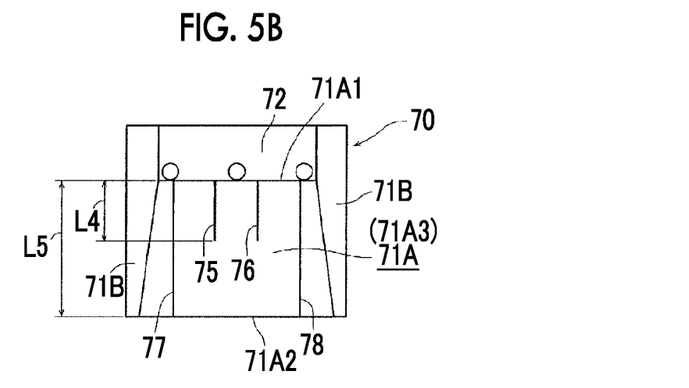
Figure 5C:
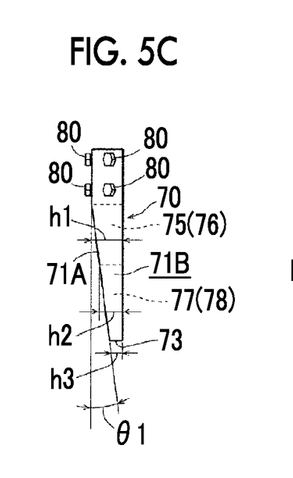
Figure 5D:
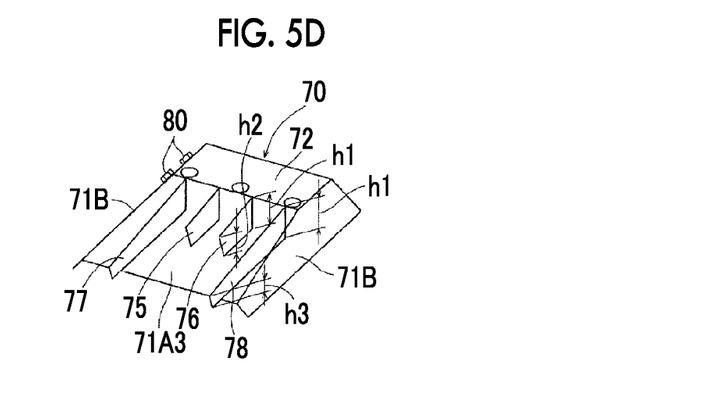

FIGS. 5A to 5D schematically show the side cover body 70, wherein FIGS. 5A to 5C are views from three directions and FIG. 5D is a perspective view as viewed from the inside. As shown in FIGS. 5A to 5D, fins 75 to 78 are provided on an inner surface (a surface facing the side surface of the reduction gear 10) 71A3 of the inclined portion 71A of the extending portion 71. In this embodiment, as the fins 75 to 78, plural kinds (two kinds) of fins 75 and 76 and fins 77 and 78 in which lengths L4 and L5 in a direction toward the intermediate shaft 16 are different from each other are prepared respectively.

Specifically, the fins 75 and 76 in which the length L4 in the direction toward the intermediate shaft 16 is short are disposed in the middle, and the fins 77 and 78 in which the length L5 in the direction toward the intermediate shaft 16 is long are disposed on both sides (sides close to the upper and lower surfaces 30D and 30E of the reduction gear casing 30) (L4<L5). Each of the fins 75 to 78 is fixed to the inner surface 71A3 of the inclined portion 71A of the extending portion 71 by welding and also functions as a reinforcing member of the side cover body 70.

Since the inclined portions 71A themselves of the extending portions 71 are provided to be inclined by $\theta 1$ so as to approach the side surfaces 30B and 30C of the reduction gear casing 30 toward the bearing supporting portions 36 and 38 of the intermediate shaft 16, the heights of the respective fins 75 to 78 become lower as they approach the bearing supporting portions 36 and 38 of the intermediate shaft 16. Specifically, with respect to the heights of the fins 75 and 76 in the middle, a height on the base end section 55 side (a height at the starting point edge 71A1) is h1 and is the highest, and a height on the side of the bearing supporting portions 36 and 38 is h2 and is lower than the height h1 on the base end section 55 side (h1>h2). Further, with respect to the heights of the fins 77 and 78 on both sides, a height on the base end section 55 side is h1 (the same as those of the fins 75 and 76 in the middle) and is the highest, and a height h3 at the opening edge 71A2 (an opening portion 73) on the side of the bearing supporting portions 36 and 38 is lower than the height h2 on the side of the bearing supporting portions 36 and 38 of the fins 75 and 76 in the middle (h1>h2>h3). Then, as a result, in any fins 75 to 78, end portions on the side of the side surfaces 30B and 30C of the reduction gear casing 30 are aligned so as to be substantially flush with each other.

However, in this embodiment, the side cover bodies 70 which include the respective fins 75 to 78 are not in contact with the side surfaces 30B and 30C of the reduction gear casing 30 (a slight gap is secured between the side cover body 70 and each of the side surfaces 30B and 30C). This is because, if the side cover bodies 70 which include the fins 75 to 78 are in contact with the side surfaces 30B and 30C of the reduction gear casing 30, the vibration of the reduction gear 10 is transmitted to the side cover bodies 70, and thus there is a concern that the bolts 80 fixing (the connecting portions 72 of) the side cover bodies 70 to the fan cover 50 may be loosened. However, on the contrary, the side cover bodies 70 including the fins 75 to 78 may be mounted in an aspect of coming into contact with the side surfaces 30B and 30C of the reduction gear casing 30. In this case, the side cover bodies 70 can more actively receive heat by heat conduction from the side surfaces 30B and 30C of the reduction gear casing 30, and therefore, it is possible to further improve the efficiency of cooling.

Next, an operation of the reduction gear 10 will be described.

If the input shaft (the first shaft) 12 is rotated by the rotation of a motor (not shown), the fan 40 connected to the input shaft 12 through the key 13 rotates. In this way, air is taken in through the through-hole 51A (and the large number of small holes) formed in the back surface portion 51 of the fan cover 50, and the taken-in air is sent radially outward as an air flow by the rotation of the fan 40. The sent air flow is turned to the reduction gear 10 side by the base end section 55 of the fan cover 50, specifically, the first and second guide portions 52 and 53 thereof. For this reason, first, the vicinity of the bearing casing 30A of the input shaft (the first shaft) 12 having the highest heat load is strongly cooled.

Here, in this embodiment, the extending portions 71 extend toward the bearing supporting portions 36 and 38 of the intermediate shaft 16 from the base end section 55. The extending portions 71 are inclined by θ1 with respect to the side surfaces 30B and 30C of the reduction gear casing 30 so as to gradually approach the side surfaces 30B and 30C toward the side of the bearing supporting portions 36 and 38 from the fan 40 side (while maintaining a parallel state in a direction perpendicular to the side surfaces 30B and 30C of the reduction gear casing 30). That is, a passage of an air flow having a height of approximately h1 at a stage of sending out from the base end section 55 is narrowed to the height of h3 at the opening portion 73 when leaving the extending portion 71. On the other hand, the bent portions 71B of both ends of the extending portion 71 prevent the diffusion in the up-and-down direction of the air flow. For this reason, as a result, in this embodiment, in excess of the effect of simply suppressing a decrease in the flow velocity of the air flow, rather, it is even possible to further increase (accelerate) the flow velocity of the air flow (according to the angle of inclination θ1).

Furthermore, in this embodiment, as the fins 75 to 78 provided on the inner surface 71A3 of the inclined portion 71A of the extending portion 71, the two kinds of fins 75 and 76 and fins 77 and 78 in which the lengths L4 and L5 are different from each other are provided, and the fins 75 and 76 having the short length L4 are disposed in the middle and the fins 77 and 78 having the long length L5 are disposed on both sides. For this reason, coupled with the existence of the bent portion 71B of the extending portion 71, the fins 77 and 78 close to the upper surface 30D and the lower surface 30E rectify an air flow over the longer length L5, and since the fins 75 and 76 in the middle have only the short length L4 (because the fins 75 and 76 are removed on the way), resistance to be applied to the air flow is minimized. In this way, it is possible to make an air flow having fast flow velocity intensively touch the vicinity of the bearing supporting portions 36 and 38 of the intermediate shaft 16, and thus it is possible to more effectively cool the intermediate shaft 16 which is at a position far from the fan 40. Incidentally, in a test by the inventor, compared to the related art, an increase in a range of two times to three times in flow velocity and a decrease in a range of 2° C. to 3° C. in surface temperature were confirmed in the vicinity of the bearing supporting portions 36 and 38 of the intermediate shaft 16.

Further, in particular, the directivity of an air flow is increased by the rectifying action of the fins 77 and 78 having the long length L5 on both sides, and therefore, the air flow with a trimmed flow flows along each of the side surfaces 30B and 30C of the reduction gear casing 30 even after leaving the opening portion 73 of the extending portion 71. For this reason, it is possible to make the air flow of the fan 40 provided at the input shaft 12 (that is, provided at the farthest end portion of the reduction gear 10) contribute to the cooling of the reduction gear casing 30 without waste to the last.

Further, the fins 75 to 78 also function as reinforcing members which reinforce the strength of the side cover body 70 configuring the extending portion 71. In the case of this embodiment, the side cover body 70 is connected to the base end section 55 of the fan cover 50 in a cantilever state through the connecting portion 72, and therefore, an increase in the strength of the side cover body 70 due to the existence of the fins 75 to 78 is particularly effective.

In addition, in the above-described embodiment, the extending portion 71 is configured by the side cover body 70 which is a separate member from the base end section 55, and is made so as to be connected to the base end section 55 by the bolt 80. However, the connection or the formation of the extending portion in certain embodiments of the present invention is not particularly limited to such bolt connection, and, for example, the extending portion may be welded to the base end section or may also be integrated with the base end section (as a single member) from the beginning.

Further, in the above-described embodiment, the rectifying effect is increased by providing the fins 75 to 78 on the inner surface 71A3 of (the inclined portion 71A of) the extending portion 71. However, in certain embodiments of the present invention, fins need not be necessarily provided at the extending portion. Further, even if the fins are provided, plural kinds of fins need not be necessarily provided and the arrangement of the fins is also not limited to the above-described example. In addition, even if the fins are provided to be erect from the side surface side of the reduction gear casing, rather than being provided at the fan cover, the same effect is obtained.

Further, in the above-described embodiment, a configuration is made such that the axial length L1 of the extending portion 71 is longer than the axial length L2 of the base end section 55, and thus the rectifying effect and the flow velocity increase effect are increased. However, even if the length of the extending portion is shorter than the base end section, a corresponding effect is obtained.

Further, in the above-described embodiment, the extending portions 71 of the fan cover 50 are formed on both the side surfaces 30B and 30C (being two surfaces) of the reduction gear casing 30. However, in certain embodiments of the present invention, even if the extending portion 71 is provided only on any one surface of the side surfaces 30B and 30C of the reduction gear casing 30, a corresponding effect is obtained.

On the contrary, extending portions secondarily extending from the fan cover may also be provided on the surfaces other than the side surface of the reduction gear casing. For example, as depicted by an imaginary line in each drawing of the above-described embodiment, an auxiliary extending portion 79 may be provided on the upper surface 30D which is a surface other than the side surfaces 30B and 30C of the reduction gear casing 30. In addition, in the example depicted by an imaginary line, the auxiliary extending portion 79 having a different form from those of the extending portions 71 toward the bearing supporting portions 36 and 38 is formed. Specifically, the auxiliary extending portion 79 depicted by the imaginary line extends parallel to the upper surface 30D of the reduction gear casing 30 (without approaching the upper surface 30D). This is because, in the case of the auxiliary extending portion 79, there is not much request for "intensively sending an air flow to a specific location". However, the auxiliary extending portion may extend so as to approach the outer surface of the reduction gear casing as it approaches the second shaft side (similar to the extending portion toward the bearing supporting portion). In this way, the effect of making flow velocity faster is obtained.

Further, in the example depicted by the imaginary line, fins 81 are also provided on the inner surface of the auxiliary extending portion 79 (refer to FIG. 3). However, the fin 81 may be omitted. Even if the fins 81 are provided, it is not necessary to necessarily prepare plural kinds of fin, and all of the respective fins 81 may have the same shape (length). In addition, an auxiliary extending portion may also be provided on the lower surface 30E of the reduction gear casing 30.

Further, in the above-described embodiment, as the power transmission device, the "orthogonal reduction gear" is illustrated. However, the power transmission device according to certain embodiments of the present invention need not necessarily be the orthogonal reduction gear and certain embodiments of the present invention are also applicable to a parallel shaft reduction gear. Further, certain embodiments of the present invention are not originally limited to a reduction gear, and if it is a "power transmission having a configuration which includes a casing, a first shaft, and a second shaft and in which the first shaft has a protruding portion that protrudes from the casing and a fan is provided at the protruding portion", certain embodiments of the present invention are applicable thereto, and in particular, with regard to the cooling of the vicinity of a bearing supporting portion of the second shaft, the same operation and effect can be obtained.

In addition, in the above-described embodiment, as a target of the second shaft, the intermediate shaft 16 equivalent to the next stage of the first shaft is dealt with. However, the second shaft in certain embodiments of the present invention need not necessarily be a shaft of the next stage of the first shaft, and, for example, a configuration is also acceptable in which a shaft (in the example of the above-described embodiment, the output shaft) of a stage after the next stage is regarded as the second shaft and an extending portion extends toward a bearing supporting portion of the shaft of the stage after the next stage. In this case, a bearing supporting portion of the shaft of the next stage is covered with an extending portion, thereby being cooled by an air flow passing through inside the extending portion, and a bearing supporting portion of the shaft of the stage after the next stage is cooled by the air flow discharged from the extending portion.

Further, in the above-described embodiment, a portion of the base end section of the fan cover is formed so as to become more distant from the axial center of the fan. However, the base end section may be parallel to the axial center.

The present invention is applicable to various power transmission devices.

It should be understood that the invention is not limited to the above-described embodiment, but may be modified into various forms on the basis of the spirit of the invention. Additionally, the modifications are included in the scope of the invention.

What is claimed is:

1. A power transmission device comprising:
   a casing;
   a first shaft; and
   a second shaft,
   wherein the first shaft comprises a protruding portion which protrudes from the casing,
   a fan is provided at the protruding portion,
   a fan cover configured to cover the fan comprises a base end section and an extending portion which extends toward a bearing supporting portion of the second shaft along a side surface of the casing, and
   the extending portion is a separate member from the base end section, is connected at a joining portion to the base end section in a cantilever state, and is inclined toward the bearing supporting portion side from the fan side such that a distance defined perpendicularly from an axial center of the fan to the extending portion distant from the joining portion is smaller than a distance defined perpendicularly from the axial center to the extending portion proximate to the joining portion.

2. The power transmission device according to claim 1, wherein a fin is provided on an inner surface of the extending portion or the side surface of the casing.

3. The power transmission device according to claim 2, wherein as the fin, plural kinds of fin in which lengths in a direction toward the second shaft are different from each other are provided.

4. The power transmission device according to claim 3, wherein as the plural kinds of fins, a fin in which a length in the direction toward the second shaft is short is disposed in the middle, and fins in which a length in the direction toward the second shaft is long are disposed on both sides.

5. The power transmission device according to claim 1, wherein the base end section is parallel to the axial center or is inclined so as to become more distant from the axial center.

6. The power transmission device according to claim 5, wherein the extending portion of the fan cover has a longer length in an axial direction of the first shaft than the base end section.

7. The power transmission device according to claim 1, wherein also on a surface other than the side surface of the casing, another extending portion extends from the fan cover.

8. The power transmission device according to claim 1, wherein the base end section includes a vertical surface having a vertical edge parallel to the side surface of the casing, a horizontal surface having a horizontal edge parallel to upper and lower surfaces of the casing, and a connection surface connecting the vertical surface and the horizontal surface, and the extending portion is connected to the vertical surface.

9. The power transmission device according to claim 1, wherein the extending portion includes an inclined portion which is inclined toward the bearing supporting portion side from the fan side so as to approach the side surface of the casing and a bent portion which is formed adjacent to the inclined portion and prevents an air flow from diffusing.

10. The power transmission device according to claim 2, wherein the extending portion includes the fin and is not in contact with the casing.

11. The power transmission device according to claim 2, wherein a height of the fin becomes lower as the fin approaches the bearing supporting portion.

* * * * *